March 11, 1947.　　N. T. LOVSTROM　　2,417,116
DRILL GRINDING TOOL
Filed April 14, 1944　　4 Sheets-Sheet 1

Inventor:
Nils T. Lovstrom,
by Thomson & Thomson
Attorneys

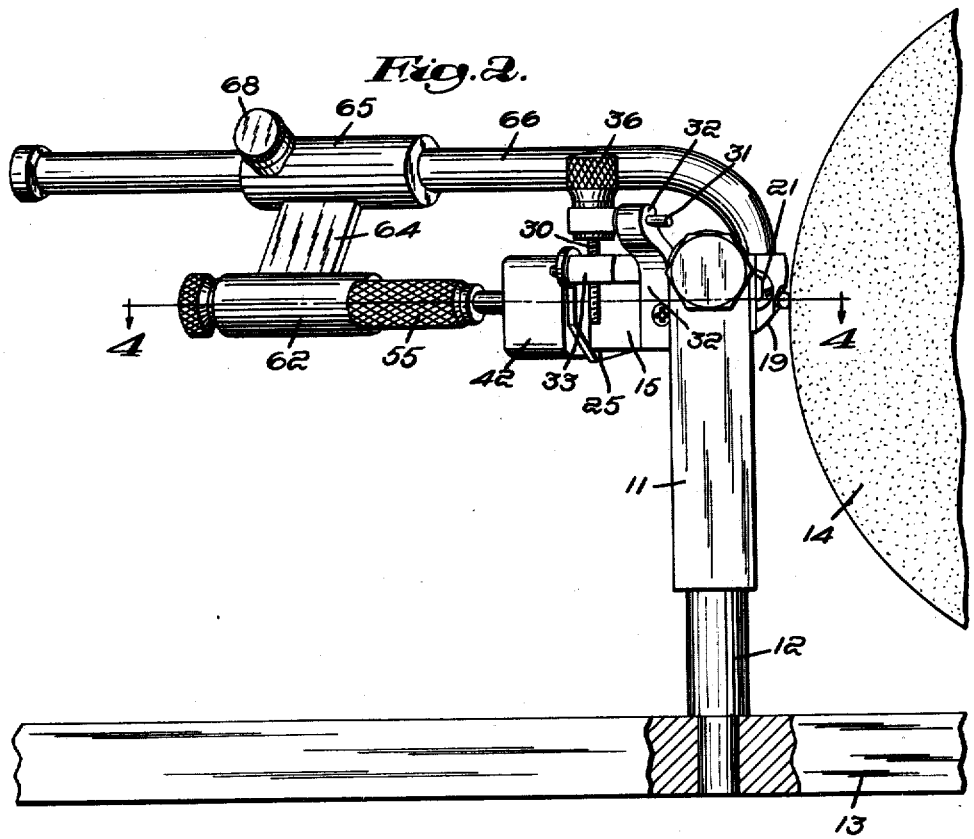
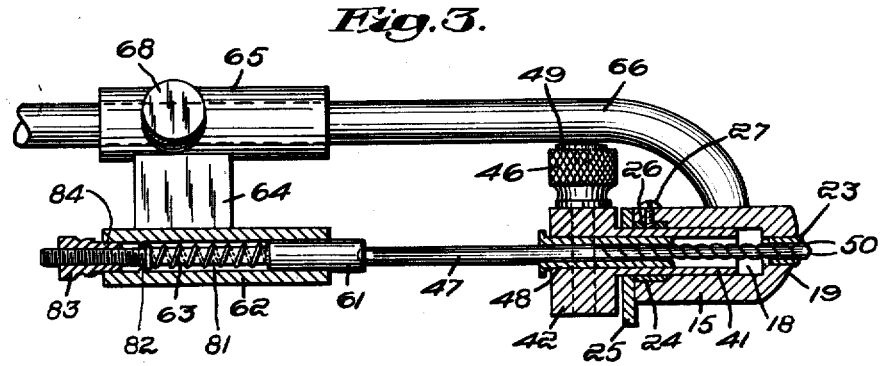

March 11, 1947. N. T. LOVSTROM 2,417,116
DRILL GRINDING TOOL
Filed April 14, 1944 4 Sheets-Sheet 3

Inventor:
Nils T. Lovstrom,
by Thomson & Thomson
Attorneys

March 11, 1947.  N. T. LOVSTROM  2,417,116
DRILL GRINDING TOOL
Filed April 14, 1944  4 Sheets-Sheet 4
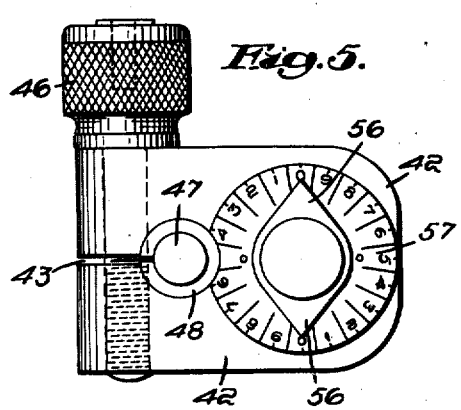
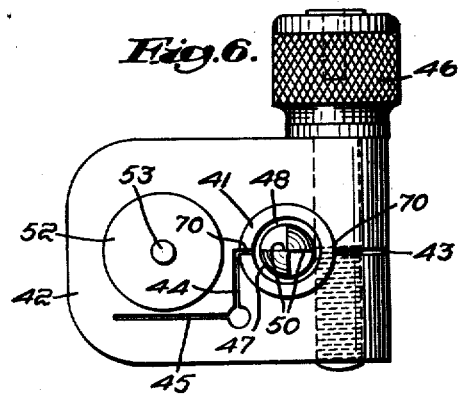
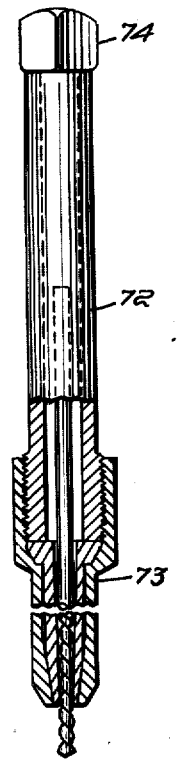
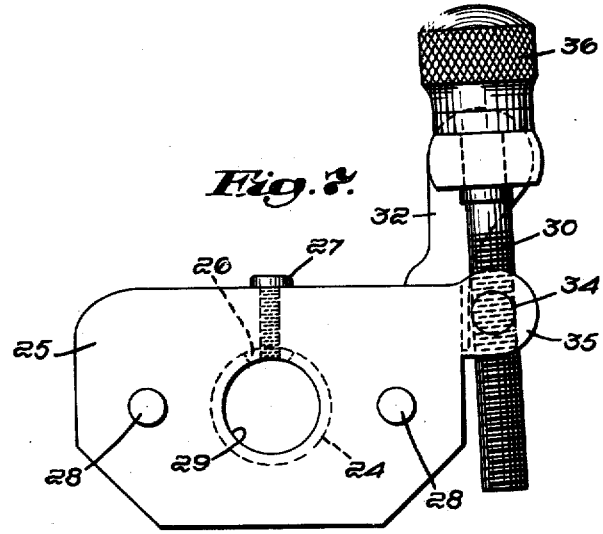
Inventor:
Nils T. Lovstrom,
by Thuman & Thuman
Attorneys Patented Mar. 11, 1947

2,417,116

UNITED STATES PATENT OFFICE 2,417,116

DRILL GRINDING TOOL

Nils T. Lovstrom, Malden, Mass.

Application April 14, 1944, Serial No. 530,972

4 Claims. (Cl. 51—219)

This invention relates to drill grinding apparatus, and pertains more particularly to improvements in tools for pointing and sharpening the lips of small twist drills.

The general purpose of the invention is to provide a compact and easily operable tool which will accurately and uniformly grind both lips of a twist drill at the desired angle, so that the drill will efficiently cut hard or soft metal, throwing off curly chips and leaving a smooth and clean hole.

The more specific objects of the invention include the provision of a grinding device having a removable drill clamp rotatably mounted in an eccentrically pivoted holder block, and movable to either one of two operative positions 180° apart, so that both lips of the drill may be successively sharpened without loosening the clamp screw or removing the clamp from the block; a feed screw threading in the clamp and reacting against the holder block to move the drill point toward or from the grinding wheel, the stem of the feed screw having an indicator associated with a graduated dial, so that the degree of movement of the drill may be accurately regulated and recorded, if desired, to ensure uniformity of both drill lips; a back plate rotatably mounted on the holder block and engaged by the drill clamp for rotating the clamp and thus backing off the drill lips to the desired angle of grind, with manual means for rotating the plate while the clamp is in operative position to adjust the setting of the lips; and an operating lever attached to the holder block and having an adjustable sleeve connected to a tail piece which is provided with a spring-pressed spindle engaging the rear end of the drill, yieldingly to hold the drill clamp in its operative positions and to cushion the grinding pressure on the drill point.

These and other features of the improved grinding tool will be apparent from the following description of a recommended embodiment of the invention, as illustrated in the accompanying drawings; but it will be understood that the structural details of the devices herein illustrated and described may be varied without departing from the essence of the invention as defined in the appended claims. In the drawings, Fig. 1 is a plan view of the drill grinding tool;

Fig. 2 is a side elevation thereof, looking to the left of Fig. 1;

Fig. 3 is a section on line 3—3 of Fig. 1;

Figs. 5 and 6 are enlarged top and bottom views, respectively, of the removable drill clamp;

Fig. 7 is an enlarged view of the rotatable back plate from which the drill clamp has been removed;

Fig. 8 is an enlarged view of an extension chuck for holding very small drills;

In the particular embodiment chosen for the purpose of illustration, the drill grinding tool is mounted in a forked support 11 fixed in upright position by a post 12 to a bench or platform 13, adjacent a grinding wheel 14. The post 12 may be secured to the platform by any suitable means so that the support is held close to the wheel and parallel to its axis; and it will be understood that the support may form part of a compound slide rest or other device which maintains it in proper operative relationship to the wheel during grinding of a drill.

Figure 10:
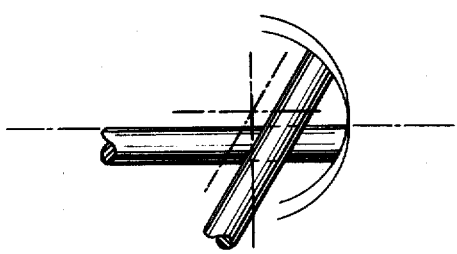
Fig. 10 is a diagrammatic view indicating the eccentric oscillation of the drill in the pivoted holder block.

A metal clamp-holding block 15 is eccentrically pivoted in the forked support, as by threaded trunnions 16 having pointed ends engaging in sockets on the opposite sides of the block, and held in fixed position relative to the arms of the fork 11 by lock nuts 17. The block has a drilled opening 18 offset from the axis of its pivot and extending at an abrupt angle to said axis, so that a drill mounted in the opening will have its lip presented to the rim of the grinding wheel at the desired angle of 59°. The face 19 of the block is ground as a compound curve on the respective centers of the block 15, as indicated more clearly in the diagrammatic view of Fig. 10; and a portion of this face is beveled off at 20 and recessed to receive a lock screw 21 which engages over a pin 22 of a bushing or adapter 23 mounted in the end of the opening 18. Several such bushings are provided to accommodate drills of varying size, and the outer end of each bushing preferably projects about $\frac{1}{32}''$ beyond the face 19 of the block and is beveled to correspond with the curvature of said face.

The inner end of the opening of the holder block 15 is enlarged to receive a sleeve 24 of a back plate 25 which removably and rotatably engages the flat rearward end of the block. The sleeve 24 has a short circumferential slot 26, and a screw 27 threading into the top of the block engages in said slot to retain the back plate in position while permitting limited rotation thereof relative to the block. The outer surface of the back plate has a pair of sockets 28 (Fig. 7) located diametrically on opposite sides of the sleeve socket 29, to receive a stud of the drill clamp as hereinafter described.

As best shown in Fig. 7, the back plate 25 is moved angularly with respect to the holder block 15 by a manually adjustable device, comprising a screw 30 pivoted by a link 31 to a bracket 32 mounted on the side of said block, and having a stem threading in a collar 33 having a pin 34 pivoted in an ear 35 of the plate 25. Hence, by turning the knob 36 of screw 30, the back plate is rotated within the limits allowed by the retaining screw 27 and slot 26.

Figure 4:
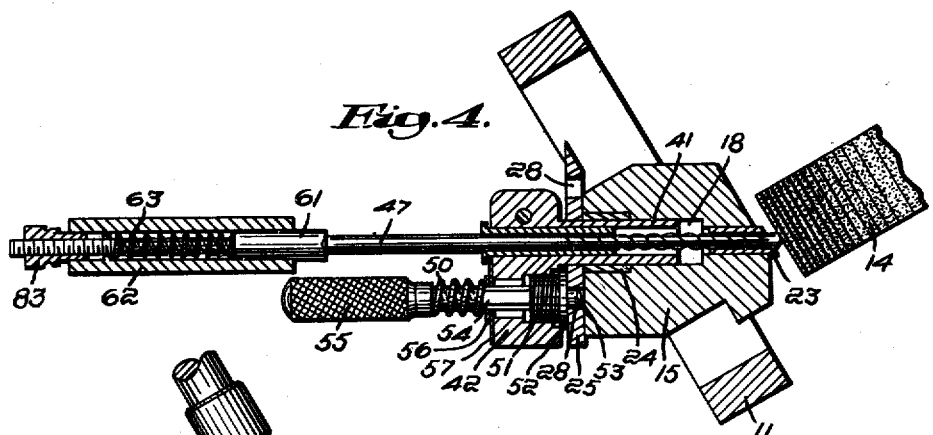
Fig. 4 is a section on line 4—4 of Fig. 2.

The plate sleeve 24 turns in the enlarged portion of the block opening 18 and is of such thickness that the bore of the sleeve registers with the main bore of said opening. These bores receive the tubular skirt 41 of a drill clamp 42, (Figs. 3 and 4), and said skirt bore continues through the body of the clamp 42. The body and skirt of the clamp may be made of one piece of metal, split as by the slots indicated at 43, 44 and 45 of Fig. 6 which communicate with slots (not shown) extending part way down the sleeve 41, so that said clamp and sleeve may be contracted by a clamp screw 46 to secure a drill within said bore. In the arrangement shown, the drill 47 is held in an adapter sleeve 48 which extends into the bore of the skirted clamp and is clamped therein by tightening the screw knob 46 which preferably has a head socket 49 for an Allen wrench.

The drill clamp 42 is rotatable relative to the back plate 25 and holder block 15, and removable therefrom, but it is normally held in one of the two operative positions, 180° apart, for alternately grinding the two lips of the drill, by pressure applied to the rearward end of the drill, to hold a stud or detent of the clamp in one of the two sockets 28 of the face plate. Hence, when positioned in either of said operative positions, the drill clamp and drill may be rotated in the holder by turning the back plate, as aforesaid, to back off or otherwise adjust the edge of the drill lips 50 relative to the grinding wheel.

The clamp 42 is also movable axially or longitudinally relative to the holder to adjust the position of the drill point with respect to the wheel. This movement is effected by a manually operated feed screw 51 which threads in an opening of the clamp and has a collar 52 bearing upon the face of the back plate 25. This collar carries a stud 53 which is releasably retained in one of said plate sockets 28 when the clamp is in operative position. The feed screw has a stem 54 and actuating knob 55, projecting rearwardly of the clamp; and the stem carries a double-pointed indicator 56 keyed thereto and registering on a graduated dial 57 located on the rear face of the clamp, the indicator being pressed against the dial by a spring 58 which serves also to tension the feed screw and prevent its accidental rotation.

Each half of the dial 57 is graduated into ten spaces, numbered 0 to 9, and these spaces may be subdivided if desired. The threads of the feed screw 51 are so pitched that the clamp 42 moves forwardly or rearwardly .040" for each complete turn of the screw, so that each numbered division of the indicator represents a movement of .002". The dial is thus graduated so that the indication of one of the pointers 56 may easily be read in either of the two operative positions of the clamp.

The drill 47 is yieldingly pressed to working position by a spindle or plunger 61 which has a cupped end engaging the rear end of the drill and which slides in a tubular tailpiece or receiver 62 which contains a coil spring 63 surrounding a reduced stem 81 of plunger 61 and seating at its outer end against an interior annular shoulder 82 of the hollow receiver. The outer end of the plunger stem 81 is threaded and normally projects beyond the end of the receiver. An adjusting nut 83, having a skirt 84 slidable in the end of the receiver, threads on the end of stem 81 and regulates the compression of spring 63, whereby the effective pressure of plunger 61 on the drill shaft 47 may be varied by turning the nut 83.

The tailpiece is connected by a web 64 to a guide sleeve 65 which is disposed parallel to the tailpiece and which slides and revolves on an operating lever 66 having a curved forward end fastened as by a screw 67 to the holder block 15. The lever extends parallel to the axis of the drill 47, so that the tailpiece may be swung into operative position in line with the drill and then moved forwardly to engage the drill end in the spindle socket and compress the spring 63 to afford the desired pressure on the drill and the clamp in which it is secured. The sleeve 65 is then locked in operating position by tightening a thumbscrew 68. Spring pressure on the drill constantly urges the drill clamp 42 toward the holder block 15, so that the clamp is moved toward or from the block by regulating the feed screw 51, as aforesaid.

It will be apparent that when the tailpiece is disengaged and swung aside, the drill clamp and drill may be removed as a unit from the holder block; and it will be understood that the pressure of the tailpiece may be partially released by moving the sleeve 65 a short distance rearwardly on the lever 66, when it is desired to rotate the clamp from one operative position to the other without disengaging the spindle 61 from the drill end.

Lever 66 is manually operated to oscillate the holder block 15 in the trunnions of the supporting fork 11, together with the drill and the other parts of the apparatus which are assembled as above described, to grind successively the respective lips 50 of the drill point against the wheel 14.

Figure 9:
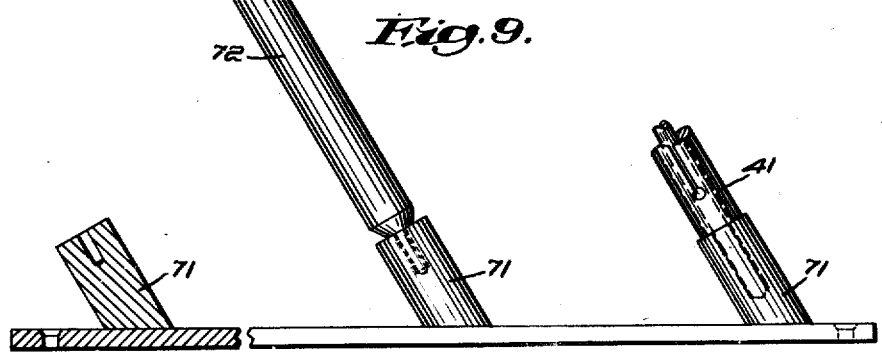
Fig. 9 is a side view, partly in section of a series of depth gauge sockets, which are desirably mounted near the grinding tool, as also indicated in Fig. 1, showing the drill holder of Fig. 8, and a part of the sleeve of the drill clamp of Figs. 5 and 6.

For ease in correctly locating the drill lengthwise in the clamp, a series of depth gauges or sockets 71 may be provided to hold drills of varying size. The clamp sleeve 41 or a special extension chuck 72 may then be applied over the shank of the drill and moved downwardly until it engages the end of the socket gauge, as shown in Fig. 9. In the first case, the clamp is then partially tightened. In the second case, the clamp chuck is tightened before it is withdrawn from the socket and inserted in the clamp where it is positioned by the engagement of the screw collar of the chuck with the outer face of the clamp.

Figure 1:
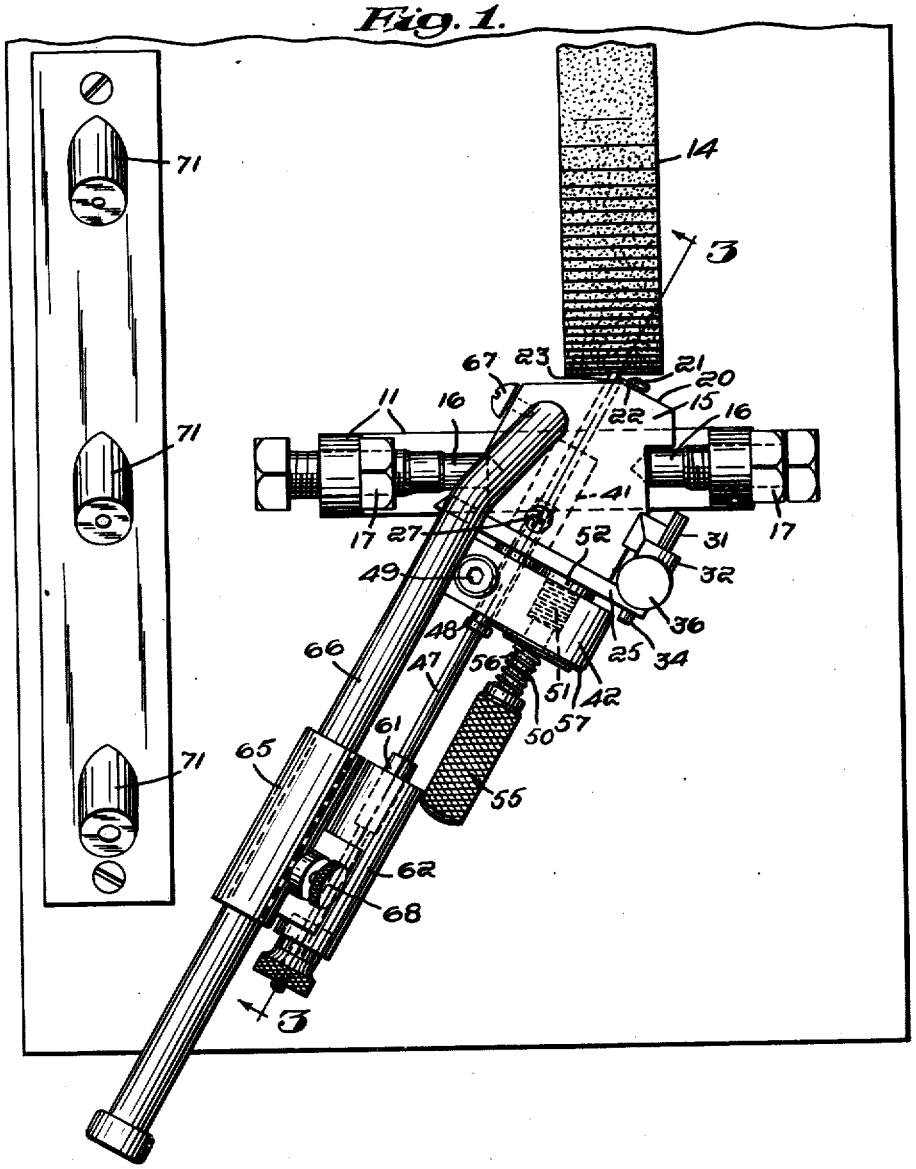

The extension chucks for very small drills may be of the form indicated in Fig. 8, where the rearward extension 72 of the chuck portion 73 takes the place of the rear end of a larger drill (such as the drill 47 of Fig. 1) and is directly engaged at its end 74 by the spindle 61 of tailpiece 62 when the extension and clamp are assembled in the grinding tool. Such chucks may be used with drills ⅛" or smaller in diameter. For drills of larger diameter, a suitable adapter, such as the sleeve 48, may be employed; but with a holder block having a ¼" bore, no adapter would be required for a drill having that diameter or one slightly smaller.

To assemble and operate the grinding tool, the clamp 42 is removed, the drill 47 with whatever adapter is needed is inserted in the bore of the clamp so that the tip projects the adjusted distance beyond the sleeve 41, the drill is rotated until the edges of the lips are aligned with a pair of guide slits 70 (Fig. 6) on the sleeve end, and the clamp screw is partially tightened. The feed screw is then preferably advanced about two turns so that the collar 52 at its inner end projects beyond the inner face of the clamp, thereby permitting subsequent adjustment of the feed screw in either direction. The back plate 25 is set in normal or neutral position with the sockets 28 in a line parallel to the flat top of holder 25. A bushing 23 of the desired size is inserted in the drill opening at the face of the holder (if a bushing is required), and locked in place by the set screw 21.

The clamp and drill are then assembled with the back plate and holder so that the positioning stud 53 is located in one of the sockets of the back plate. If the drill point is in approximately correct position with relation to the face of the holder, which may have a score line thereon as an additional gauge for aligning the angular position of the lips, the clamp screw is firmly tightened and the tail piece is engaged with the rear end of the drill and locked by set screw 68.

The precise position of the drill point relative to the grinding wheel may then be regulated, before the wheel is started, by adjusting the feed screw 55, and the lips may be backed off from the normal angle or otherwise regulated by turning the back plate adjusting knob 36 to rotate the clamp 42. With the operating lever elevated to depress the drill point below the wheel 14, the wheel is then started and the lever is slowly depressed to grind one lip of the drill. After raising the lever, the feed screw is advanced and this operation is repeated until about .010" of steel has been removed. This is usually accomplished in three or four strokes, and the feed screw will have been rotated approximately one quarter turn.

After noting the starting and finishing positions of the indicator pointer, the tail piece pressure is partially released, the clamp is rotated one-half turn to its second position, the feed screw is turned back to the previous starting position, and the tail piece is reset. The other drill lip is then sharpened, and the drill is preferably advanced .001" more than on the first operation. After resetting the clamp to first position, the first lip is reground to the same extent as the second, and the sharpened drill is ready to be removed and used.

A drill grinding tool of the character herein described comprises relatively few easily made parts, and avoids the use of adjusting cams or other parts which are subject to wear in operating; it affords simple and accurate means for correctly positioning the drill lips relative to the grinding wheel, and permits the drill to be moved both axially and angularly without releasing the screw of the drill clamp, for fine adjustment and for feeding the drill to the wheel; and it ensures uniform sharpening of both drill lips by providing a rotatable clamp which may be quickly turned to from one operative position to the other, and a feed screw indicator which accurately measures the forward movement of the drill during successive grinding of the respective lips. The apparatus as a whole is compact and handy to operate, and only one stroke of the operating lever is necessary at each advancing position of the drill. The drill point may be conveniently inspected at any stage of the work, when the lever is depressed, and the drill clamp may be removed and replaced, if desired, without changing the setting of the adjusting devices.

Although the improved tool was devised especially for sharpening small sized drills, for which no satisfactory grinding machine has heretofore been devised, as far as I am aware, its structural features may obviously be utilized in designing a machine for larger drills; and the scope of this invention is not intended to be restricted to use for drills of the sizes referred to herein, or to the precise mechanisms herein illustrated and described.

I claim:

1. In a drill grinding tool, a support, a holder block pivotally mounted in said support for swinging movement relative to the face of a grinding wheel, a removable drill clamp having a skirt rotatable in said block and adapted to grip a drill extending through said skirt and said block, resilient means normally holding the clamp skirt in the block and pressing the clamp toward operative position, a back plate rotatably mounted on said skirt between the block and clamp, the plate having a pair of recesses spaced 180° from each other, a feed screw carried by the clamp and having a portion bearing on said plate and a stud selectively engageable in each of said recesses to hold the clamp in either one of two operative positions, and manually actuated means for rotating said plate and clamp while the clamp is held in either of said positions, said feed screw being actuable to adjust the axial position of said clamp and drill relative to the holder block.

2. In a drill grinding tool, a support, a holder block pivotally mounted in said support for swinging movement relative to the face of a grinding wheel, a removable drill clamp having a skirt rotatable in said block and adapted to grip a drill extending through said skirt and said block, resilient means normally holding the clamp skirt in the block and pressing the clamp toward operative position, a back plate rotatably mounted on said skirt between the block and clamp, the plate having a pair of recesses spaced 180° from each other, a feed screw carried by the clamp and having a portion bearing on said plate and a stud selectively engageable in each of said recesses to hold the clamp in either one of two operative positions, manually actuated means for rotating said plate and clamp while the clamp is held in either of said positions, said plate having a sleeve received in an opening of said block and the sleeve receiving said clamp skirt, the sleeve having a slot and means engaging the slot for removably holding the plate in useful position and limiting its rotation.

3. A drill grinding tool comprising a support, a holder block pivotally mounted in said support for swinging movement relative to the face of a grinding wheel, said block having an opening therethrough oblique to the axis of the pivot and eccentrically disposed with respect thereto, a removable back plate having a sleeve rotatable in said opening, means retaining the back plate against longitudinal movement while permitting limited rotation thereof, a removable drill clamp having a skirt rotatable in the sleeve of said plate and in the opening of said block, the clamp being adapted to engage a drill extending therethrough and through said block opening, a feed screw carried by the clamp and bearing against said plate to adjust the axial position of the clamp and drill relative to the block, the plate having a pair of sockets spaced 180° and the feed screw having a stud selectively engageable in the respective sockets to hold the clamp in each of two operative positions for sharpening the respective lips of the drill, a lever for oscillating the holder block, means carried by the lever for yieldingly holding the clamp in each of said operative positions, and manually actuated means associated with said plate for rotating the back plate and drill clamp while the latter is held in either operative position.

4. A drill grinding tool comprising a support, a holder block pivotally mounted in said support for swinging movement relative to the face of a grinding wheel, said block having an opening therethrough oblique to the axis of the pivot and eccentrically disposed with respect thereto, a removable back plate having a sleeve rotatable in said opening, means retaining the back plate against longitudinal movement while permitting limited rotation thereof, a removable drill clamp having a skirt rotatable in the sleeve of said plate and in the opening of said block, the clamp being adapted to engage a drill extending therethrough and through said block opening, a feed screw carried by the clamp and bearing against said plate to adjust the axial position of the clamp and drill relative to the block, the plate having a pair of sockets spaced 180° and the feed screw having a stud selectively engageable in the respective sockets to hold the clamp in each of two operative positions for sharpening the respective lips of the drill, a lever for oscillating the holder block, means carried by the lever for yieldingly holding the clamp in each of said operative positions, and manually actuated means associated with said plate for rotating the back plate and drill clamp while the latter is held in either operative position, the feed screw having an indicator and the exposed face of the drill clamp having a dial associated with the indicator, so that the feed screw may be reset to predetermined position when the clamp is moved from one operative position to the other.

NILS T. LOVSTROM.

REFERENCES CITED

The following references are of record in the file of this patent:

UNITED STATES PATENTS

| Number | Name | Date |
|---|---|---|
| 1,426,579 | Lueck | Aug. 22, 1922 |
| 2,098,267 | Weishampel | Nov. 9, 1937 |
| 2,142,923 | Stocking | Jan. 3, 1939 |
| 2,245,858 | Hornberger | June 17, 1941 |
| 748,651 | Reimann | Jan. 5, 1904 |
| 1,388,039 | Hinz | Aug. 16, 1921 |
| 2,024,263 | Bausch et al | Dec. 17, 1935 |